G. E. BARSTOW.
CLAMP FOR ELECTRIC METAL WORKING APPARATUS.
APPLICATION FILED JUNE 10, 1911.
1,052,787.
Patented Feb. 11, 1913.
3 SHEETS—SHEET 3.
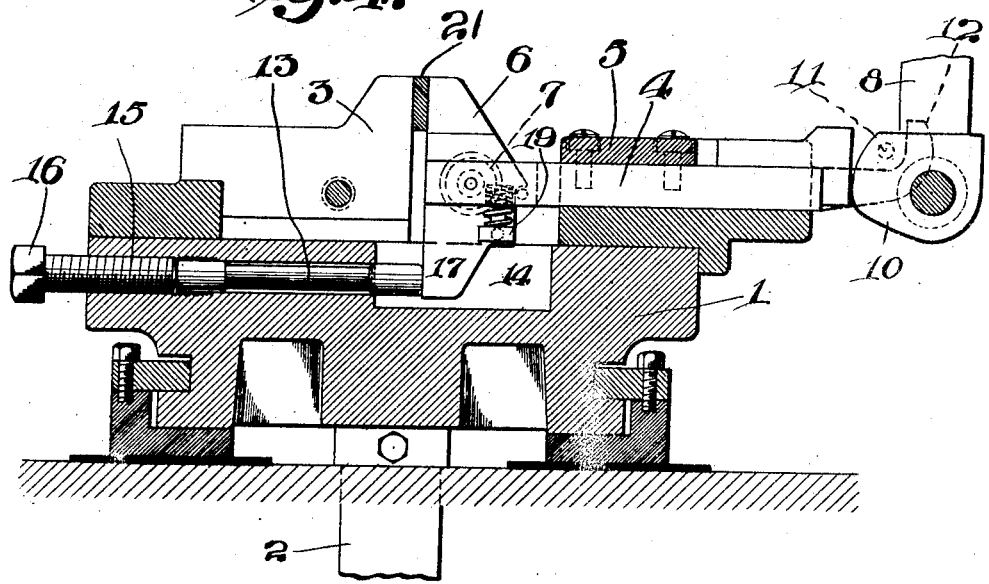
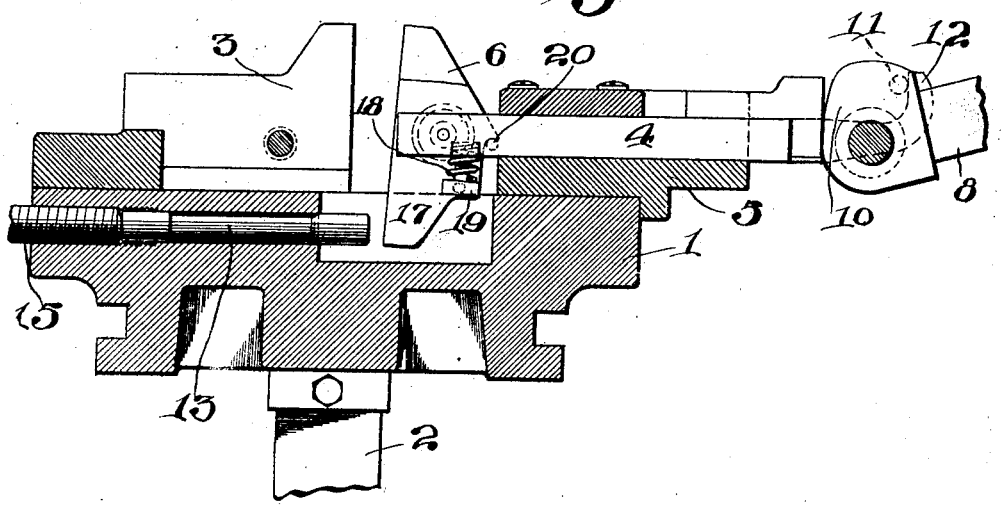
WITNESSES:
INVENTOR
GEORGE E. BARSTOW.
BY
*Townsend & Seeber*
ATTORNEYS

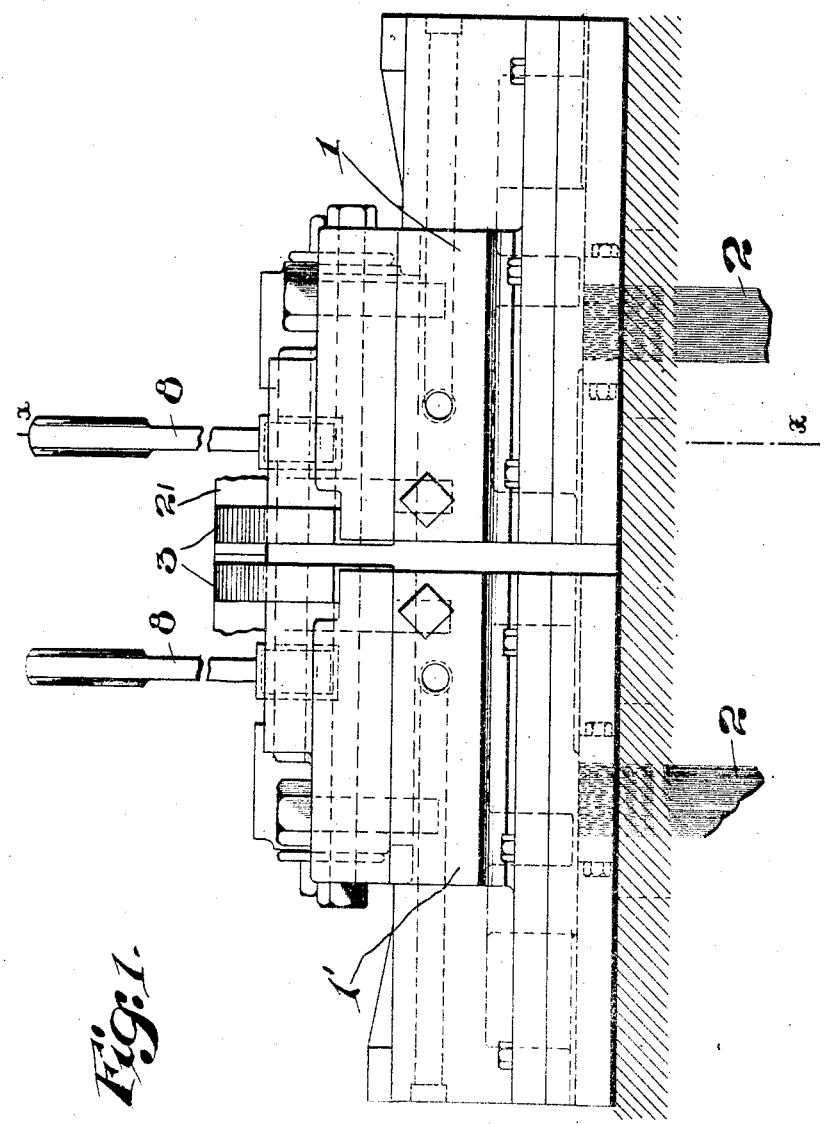

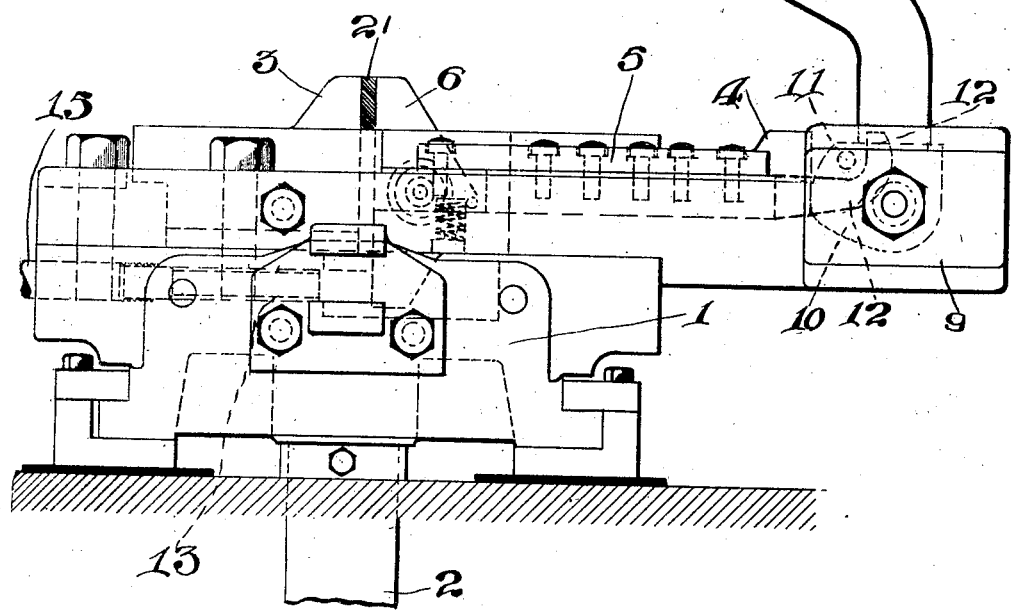
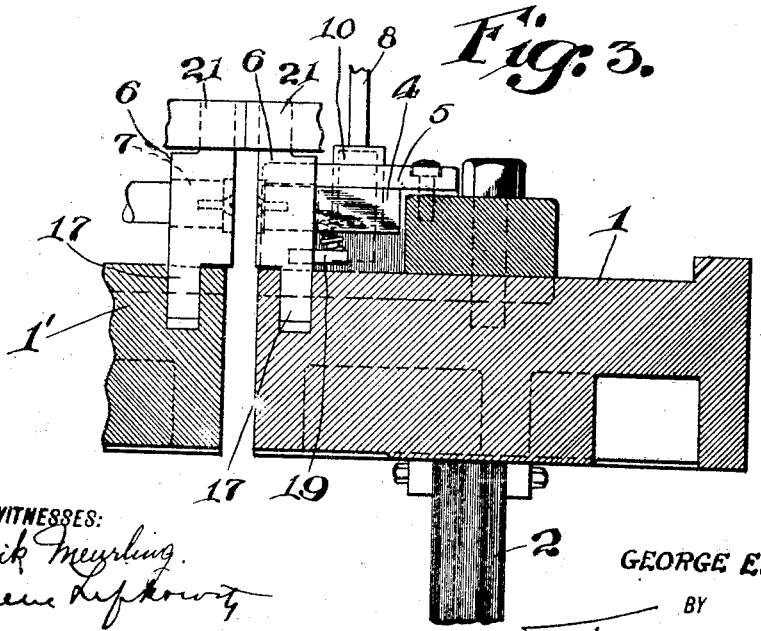

UNITED STATES PATENT OFFICE.

GEORGE E. BARSTOW, OF LYNN, MASSACHUSETTS, ASSIGNOR TO THOMSON ELECTRIC WELDING COMPANY, OF LYNN, MASSACHUSETTS, A CORPORATION OF MASSACHUSETTS.

CLAMP FOR ELECTRIC METAL-WORKING APPARATUS.

1,052,787.  Specification of Letters Patent.  Patented Feb. 11, 1913.

Application filed June 10, 1911. Serial No. 632,368.

*To all whom it may concern:*

Be it known that I, GEORGE E. BARSTOW, a citizen of the United States, and a resident of Lynn, in the county of Essex and State of Massachusetts, have invented certain new and useful Improvements in Clamps for Electric Metal-Working Apparatus, of which the following is a specification.

My invention relates to work-clamping mechanism for electric metal working apparatus and is designed to cause the work to heat uniformly across its width.

In electric metal working apparatus, more noticeably when operating on wide stock, the part of the work farthest from the primary coil of the transformer takes the longest and is the hardest to heat and therefore considerable difficulty is experienced in heating uniformly across the line of weld or part to be otherwise worked especially in the case of wide stock when positioned vertically in the machine.

In accordance with this invention, the above referred to difficulty is overcome by varying the biting effect or the pressure of the clamping jaw on the stock to be welded or otherwise worked, the clamping jaw forming a contact for feeding current to the work. By causing the clamping jaw to bite harder or apply an increased pressure at the part of the stock remote from the primary coil, the current will flow more readily through the work at the point of greatest pressure and the section of work will heat more uniformly.

The invention consists in the improved clamp for electric metal working apparatus hereinafter described and set forth in the claims.

The invention also consists in the details of construction and combinations of parts hereinafter more particularly described and then specified in the claims.

In the accompanying drawings, Figure 1 is a front elevation of an electric welding apparatus having my invention applied thereto. Fig. 2 is an end elevation of the same. Fig. 3 is a longitudinal section through the apparatus taken on the line of the work, parts being shown in elevation. Fig. 4 is a transverse section taken on the line X X Fig. 1, parts being shown in elevation. This figure shows the work in clamped position between the clamping jaws. Fig. 5 is a similar view to Fig. 4 showing the clamping jaws in unclamped position after release of the work.

In the drawings the usual platens or supports for the work-clamping mechanism are indicated at 1, 1'. These platens work in the usual way upon any proper guides on the frame or table of the machine and are connected to a source of electric energy such, for instance, as the flexible secondary 2 of a transformer in a manner well known in the art and which need not be here described in detail.

Either one or both platens may be movable in their guides by any suitable means to apply welding or upsetting pressure to the heated section of the work by any of the means now well known to those skilled in the electric metal working art. Such well known means it is not necessary to show or further describe in detail as they form no part of the present invention.

Both platens being duplicates as regards the work-clamping mechanism carried thereby, a description of one will suffice for both, it being understood that the work clamping mechanism on each platen grips the work either side of the line of desired weld or other working of the stock.

3 indicates a fixed clamping jaw mounted on the platen 1 and in the present case disposed transversely to the line of upsetting movement of the platen.

4 indicates a freely mounted slide mounted in guides 5 and movable transversely of the platen 1 to cause it to travel toward and away from the fixed clamping jaw 3. The slide 4 carries on its inner end a clamping jaw 6 pivotally mounted on a projection or stud 7 extending from the side of the slide 4.

8 indicates a clamping lever pivotally mounted in a bracket 9 secured to the platen and provided with a cam 10 which engages the rear end of the slide 4 and in one direction of rotation causes the jaw 6 to be moved toward the jaw 3. When the cam 10 is rotated in the reverse direction, by means of the lever 8, the slide 4 is retracted by means of a pin 11 projecting from the side of the cam 10, and carried thereby, engaging a hook 12 secured to the slide 4 and the jaw 6 is consequently drawn away from the jaw 3.

13 indicates a rod loosely mounted in the platen 1 and projecting into a pocket or cavity 14 formed in the top of the platen.

15 indicates an adjusting screw in alinement with the rod 13 and provided with a head 16 by means of which the end of the rod 13 is caused to project a greater or less extent into the pocket 14. The clamping jaw 6 is provided with an arm 17 projecting into the pocket 14 and in such position that it will strike the end of the rod 13 when the jaw has traveled a sufficient distance as will be hereinafter described.

Normally, when the slide 4 is retracted and the clamp open, a spring 18, compressed between a ledge 19 secured to the arm 17 and the slide 4, tips or rocks the jaw 6 until its movement is stopped by a pin 20 secured to the slide 4. When the jaw is moved forward by the clamping lever 8, the arm 17 of the jaw 6 strikes the projecting end of the rod 13 and tips or rocks the jaw and causes it to be tilted more or less depending on the amount the end of the rod 13 projects and therefore the points during the travel of the slide 4 that it strikes the arm 17.

The operation of the device is as follows: The work to be operated on, that is, welded or otherwise worked, and in the case illustrated consisting of a rectangular section of stock 21, is placed between the jaws 3 and 6 and the clamping lever 8 brought forward. This action causes the jaw 6 to travel forward with the slide 4 and at a predetermined point the arm 17 strikes the end of the rod 13 after which further movement of the slide 4 causes the upper end of the jaw 6 to travel forward and grip the upper end of the work with more or less pressure due to the position of the end of the rod 13. By adjusting the screw 15, the end of the rod 13 can be made to tip the jaw 6 more or less and so increase or decrease the pressure at the outer end of the work as desired. Heretofore, in clamps for this class of work, the jaw 6 was rigidly secured to the slide 4 and the tendency of the slide to lift as the clamping pressure was applied was sufficient to take the pressure off the upper part of the work and apply it at the lower part whereby satisfactory heating could not be obtained. By the construction of rocking jaw in accordance with this invention this difficulty has been successfully overcome.

It will be understood that my invention is not limited to the details of construction shown and described, the same being illustrative only, but various departures and modifications might be resorted to without departing from the spirit of the invention as set forth in the appended claims.

What I claim as my invention is:

1. In an electric metal working apparatus, the combination of a clamping jaw and means acting on said jaw to automatically vary the clamping pressure on different parts of the work.

2. In an electric metal working apparatus, the combination of a pivotally mounted clamping jaw and means for automatically rocking said jaw to vary the clamping pressure on different parts of the work.

3. In an electric metal working apparatus, the combination of a pivotally mounted clamping jaw movable bodily to engage the work and means for automatically rocking said jaw in a predetermined point in its movement to adjust the clamping pressure on the work.

4. In an electric metal working apparatus, the combination of a pivotally mounted clamping jaw and adjustable means adapted to automatically rock said jaw to adjust the clamping pressure on different parts of the work.

5. In an electric metal working apparatus, the combination of a slide, a clamping jaw pivotally mounted on said slide and means independent of the work and adapted to automatically rock said jaw to adjust the clamping pressure on the work.

6. In an electric metal working apparatus, the combination of a slide movable transversely to the work, a clamping jaw carried by said slide and means acting on said jaw at a predetermined point in the travel of said slide and adapted to adjust the pressure of said jaw on different parts of the work.

7. In an electric metal working apparatus, the combination of a slide, a pivotally mounted clamping jaw carried thereby and an adjustable stop adapted to strike said jaw at a predetermined point in the travel of said slide whereby further movement of the slide will cause said jaw to be rocked about its pivot as and for the purpose described.

8. In an electric metal working apparatus, the combination of a fixed clamping jaw, a laterally movable clamping jaw and an adjustable stop adapted to rock said movable jaw at a predetermined point in its movement as and for the purpose described.

9. In an electric metal working apparatus, the combination of a fixed clamping jaw, a slide movable laterally to the work, a pivotally mounted clamping jaw carried by said slide, a stop located in the path of travel of said jaw to rock the same at a predetermined point in its movement and means for adjusting the position of said stop.

10. In an electric metal working apparatus, the combination of fixed and movable clamping jaws adapted to supply current to the work, a pivotal mounting for one of said jaws and means adapted to vary the clamping pressure of said jaws on different parts of the work by swinging said jaw about its pivot.

11. In an electric metal working apparatus, the combination of fixed and movable clamping jaws adapted to supply current to the work and means adapted to automatically vary the clamping pressure of said jaws on different parts of the same section of work at a pre-determined point in the travel of the movable jaw.

Signed at Lynn in the county of Essex and State of Mass. this 8th day of June A. D. 1911.

GEORGE E. BARSTOW.

Witnesses:
GEO. W. N. CHADWELL,
JAMES F. DEARBORN.